United States Patent [19]
Fisher

[11] 3,826,458
[45] July 30, 1974

[54] PLASTIC FASTENER
[75] Inventor: Julian Vernon Fisher, Carpentersville, Ill.
[73] Assignee: Illinois Tool Works, Inc., Chicago, Ill.
[22] Filed: Feb. 20, 1973
[21] Appl. No.: 333,574

[52] U.S. Cl. .................................. 248/239, 85/80
[51] Int. Cl. ........................................ A47g 29/02
[58] Field of Search ....... 248/220.5, 239; 52/758 D; 85/5 R, 80; 151/41, 75; 403/408

[56] References Cited
UNITED STATES PATENTS

| | | | |
|---|---|---|---|
| 2,940,558 | 6/1960 | Schlueter | 403/408 |
| 2,984,698 | 5/1961 | Strauss | 85/80 X |
| 3,179,367 | 4/1965 | Rapata | 85/5 R X |
| 3,443,783 | 5/1969 | Fisher | 248/220.5 |
| 3,469,493 | 9/1969 | Fisher | 248/239 X |

*Primary Examiner*—William H. Schultz
*Attorney, Agent, or Firm*—R. W. Beart; J. R. Halvorsen

[57] ABSTRACT

A one piece plastic fastener for application to one side of a panel having a generally square aperture and adapted to cooperate with secondary means located on the opposite side of the panel. The fastener has a tapered thin-wall cup-shaped head for engaging said opposite side of the panel adjacent the edges of the aperture when the fastener is telescoped and then rotated in the aperture with angularly offset rigid means adjacent said head traversing the aperture after rotation of the fastener and cooperating with said aperture to prevent unintentional retrograde rotation.

16 Claims, 12 Drawing Figures

PATENTED JUL 30 1974 3,826,458

PLASTIC FASTENER

BACKGROUND OF THE INVENTION

In the field of fastening technology, a common problem has confronted designers where a fastening is applied to thin sheet material and a heavy load is placed on the fastening system. Normally, this has resulted in a deformation of the sheet. This is particularly true in the hard goods trade for products such as vacuum formed plastic refrigerator liners, television cabinets, dishwasher shelf support rollers and other various applications where it is desired to provide a fastener which is capable of being disposed on the blind side of a panel through an aperture and to provide an anchoring means available through the front side of the panel. Unless the load on the support is spread over a wide area, the plastic liner of a refrigerator may stress crack, or, in the case of sheet metal, buckle or deform. Early attempts have been directed primarily to the disposition of a fastener from the front side of the panel and related art covering similar devices can be found in the patents to E. Schlueter, U.S. Pat. No. 2,940,558 and J. V. Fisher, U.S. Pat. No. 3,443,783. Both of these patents are directed to fasteners which are applied from the front side of a panel and after telescopic association with aperture in said panel, are rotated approximately 45° to engage shoulder means on the back side of the panel. While both of these patents disclose devices which are functional for light loads, they do not serve as the ultimate solution nor do they suggest the usage of such a fastener from the blind side to provide suitable means for acceptance of a secondary fastening system on the front side of the panel.

SUMMARY OF INVENTION

An object of the present invention is to provide a one-eighth turn anchor for fastening in plastic and metal sheet which will accept a screw or other secondary fastening means from the opposite side of the panel. The device can be used as a screw fastening of variable styles of shelf supports to vacuum formed plastic refrigerator liners. The wide flange of the proposed anchor spreads the load over a wide area and substantially eliminates the problem of stress cracking.

The fastener contemplates a first generally square cup-shaped head which tapers outwardly towards its free end and being generally resilient in nature. This head is attached to a rigid element adapted to traverse and be accepted within a complimentary hole in the panel. The wide flange serves as a second head to grasp the opposite side of the panel and to spread the load over a wide area, as mentioned hereinabove. Additionally, the anchor includes rotation inducing means of a non-circular configuration and a body portion for acceptance of a closed bore communicating through the first mentioned head. Where a screw is utilized with the anchor, it is completely enclosed thereby preventing abrasion of wires or insulation by its point. The second head or wide flange seals the hole in the panel allowing trouble-free installation of pressurized foam insulation on the backside of the panel with the non-circular rotation inducing means cooperating with the foam, in that particular example, to assist the rigid means in preventing rotation of the anchor when a screw is driven into the bore from the front side of the panel.

An additional advantage is that the anchor may be telescoped into the hole and a one-eighth turn will firmly lock it in place. This positive locking means that the anchor can be installed at the most convenient point along the assembly line and will not fall out before the screw or other fastening means is driven.

An additional advantage is the fact that this anchor with its tapered first head will accommodate a wide variation in panel thicknesses and additionally, can be economically fabricated in simple injection molds.

Other objects and advantages of the present invention will become apparent to those skilled in the art when the specification is read in conjunction with the drawing.

Figure 1:
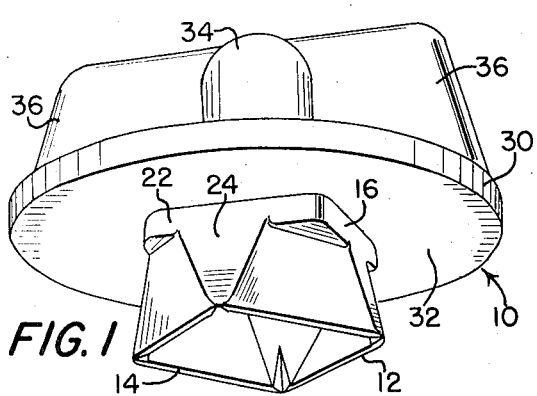
FIG. 1 is a perspective view of a preferred embodiment of the present invention.
Figure 2:
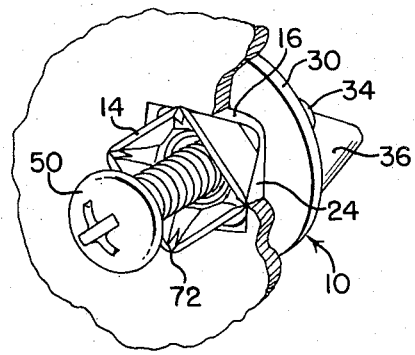
FIG. 2 is a perspective view of the embodiment shown in FIG. 1 installed in a panel in partial section with a screw threaded member engaged therein.
Figure 3:
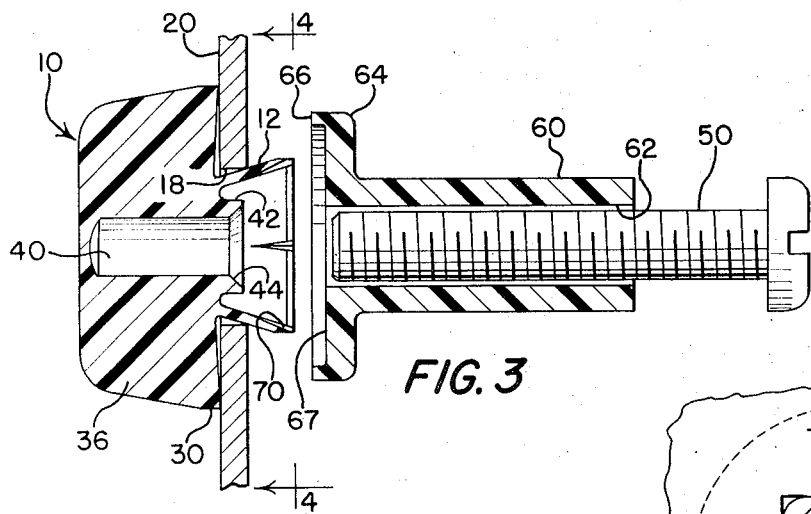
FIG. 3 is an expanded side elevation in partial section of an anchor in installed position ready to accept a secondary fastening means, the section of the anchor being taken along line 3—3 in FIG. 4.

Referring now to the drawings more in detail, wherein like numerals have been employed to designate similar parts throughout the various views, it will be seen that one embodiment of the fastener contemplated by the present invention and shown in FIGS. 1 through 6 inclusive, is designated generally by the numeral 10. The anchor 10 includes a polygonal or generally square shaped head 12 which has a substantially uniform thickness in its walls 14 that taper outwardly from the base to their free extremity to form a cup-like configuration. The head 12 is attached to a relatively rigid element 16 having at least portions thereof corresponding to and adapted to cooperate with the aperture 18 in the panel 20. In the present embodiment, the rigid element 16 is shown as being four-sided and generally square in configuration for cooperation with the aperture in the panel. The sides 22 in this embodiment are flat, but with slightly rounded corners, for convenience in manufacture, and adapted to generally conform to and cooperate with the sides of aperture 18 to prevent rotation of the anchor in mounted position. It should be noted, however, that sides 22 of rigid member 16 do not have to be continuous in configuration, as shown in the drawing, but may form a plurality of spaced protuberance means generally disposed along one or more lines generally complementary to at least one side in the aperture for purposes of rotation prevention, as best seen hereinafter.

In the illustrated embodiment, each of the corners of the head 12 are truncated by a surface 24 which falls in an angled plane that substantially includes the adjacent flat side of the rigid element and a point adjacent the outer extremity of said corner. Since the surface 24 tapers outwardly from its juxtaposition to the rigid element 16 to its free extremity, it forms a cammed surface for engagement with the edge of the aperture 18 in panel 20. As will be apparent from the drawing, rigid element 16 is angularly rotated above its axis from the head 12 so that it is disposed at approximately 45° relative to the disposition of the head 12.

Spaced from the clamping surfaces of head 12 is a second head 30 having a broad clamping surface 32, an upstanding body portion 34, and, in the present embodiment, one or more laterally extending wing elements 36. The head 30 is of substantial size and in the present instance, is generally circular in configuration to provide a broad engagement with one side of the panel 20. It will be recognized that the head 30 can assume any desired configuration such as oval, trapezoidal, triangular, etc., but preferably has a substantial extent so as to distribute the load over a broad area. The clamping surface 32 may be slightly dished to serve as a line engagement seal at its outer edge, as well as to give a slight resilience to head 30 and thereby afford some takeup for panel variation and thickness. The body 34 in the present embodiment is provided with a central bore 40 closed at its outer end and open and communicating with the interior of first-mentioned head 12. A portion 42 of the body 34 extends inwardly within the cavity of the cup-like head 12 and is provided with a chamfered lead in surface 44 to assist in locating the secondary fastening means within the bore 40. The bore 40 is generally dimensioned to accept such a secondary fastening means as this groove 50.

To install an anchor fastener of the type contemplated by the present invention, the head 12 is telescoped into the hole 18 and the entire fastener 10 rotated approximately a one-eighth turn. The head 12 being thin walled and resilient in nature, will deform along the cam surface 24 until the rigid element 16 is aligned with the aperture 18 at which time it snaps axially into position with the corner surfaces 24 overlying the edges of the aperture 18 and the back side of panel 20 with the resilience of the head 12 and its cammed surfaces 24 pulling the second-mentioned head 30 into snug engagement with the opposite side of the panel 20. This positive locking of the fastener in the aperture means the anchor can be installed at any convenient point along an assembly line with all secondary operations being carried out and insuring the position of a means for selectively applying a secondary fastening means at any later point along the assembly line. It will be recognized that many manufacturers utilize a single body shell and provide several models utilizing the basic body shell by the variation in style and quality of hardware applied to the interior of the basic body shell. As an illustrative example shown in FIGS. 3 and 5, it is possible for the manufacturer to apply a shelf support, in the case of a refrigerator or other appliance, such as that designated by the numeral 60. The screw 50 is telescoped within a central bore 62, introduced into the bore 40, and, by suitable thread cutting or thread forming means carried by the screw 50, a thread is impressed in the bore 40 and the shelf support 60 having a wide bearing flange 64 with a sealing edge 66 is brought into mounted position relative to the inside face of the panel 20. It should be recognized that the screw 50 could also be an integral part of support 60 or alternatively, could be an insert molded part, not shown, and thereby, in either instance, provide a part that is totally plastic in the exposed portions thereof.

Figure 5:
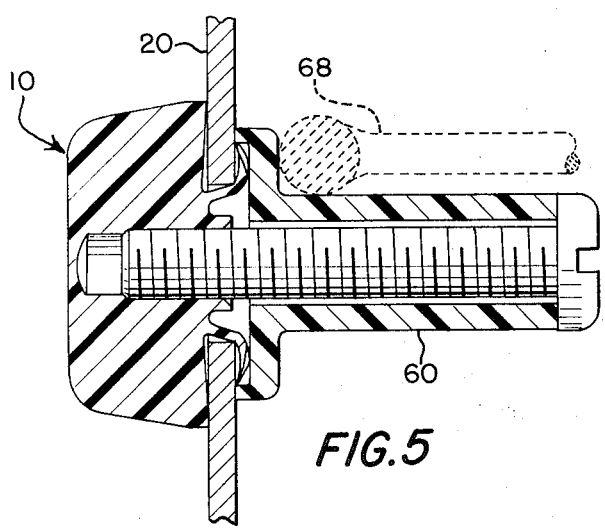
FIG. 5 is an elevational view in section showing the secondary fastening means of FIG. 3 in final installed position.
Figure 6:
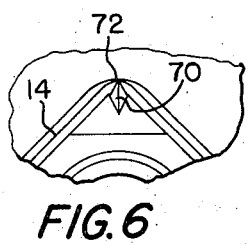
FIG. 6 is a fragmentary enlarged view of one corner of the fastener shown in FIG. 4.

In many instances, for esthetic reasons, it is desirable to keep the flange 64 with a minimum axial height so that shelving 68, shown in phantom in FIG. 5, which is to be mounted on the support 60, will be positioned relatively close to the interior of panel 20. To accommodate such situation, the present anchor fastener 10, and particularly its head 12, may be provided with grooves or relieved portions 70 in each of its corners, thereby creating a weakened portion in the wall 14. By application of an axial force against the free end of head 12, it is possible to rupture or split the head 12 in each of its corners, causing the wall 14 to petal over the opposite surface of the panel 20, as shown in FIG. 5. In the present instance, the sealing portion 66 is axially spaced a shorter distance from clamping face 67 of flange 64 than the axial projection of head 12 through the opposite side of panel 20. Thus, the clamping forces created by the introduction of the screw 50 into the bore 40 and the pull up of its head against the end of support 60 causes the clamping face 67 to force the tapered head 12 radially outwardly from its initial position, rupturing or splitting the walls 14 at their thinned portion 72 resulting in the petaling of the wall 14 outwardly over the panel 20 in the fashion shown in FIG. 5. The sealing means 66 forms a cavity for retention of the petals wholly internally of the cavity to thereby promote the total esthetic appearance within the appliance.

Figure 4:
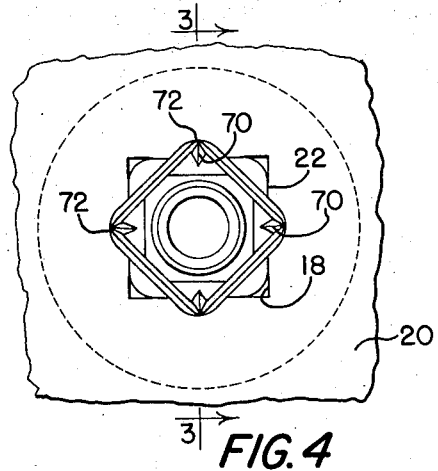
FIG. 4 is an end elevational view taken along the line 4—4 of FIG. 3.
Figure 10:
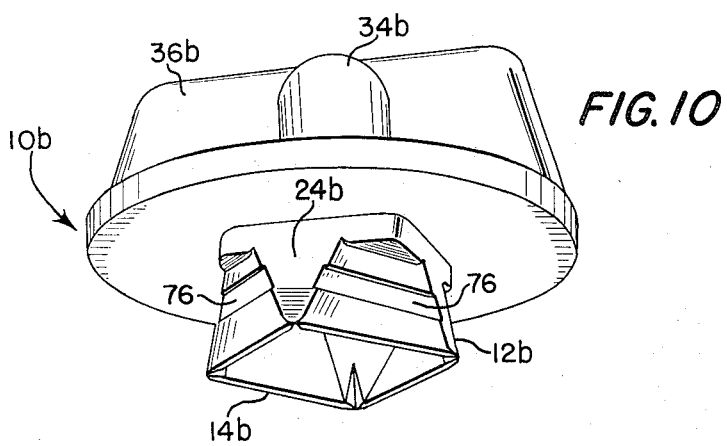
FIG. 10 is a partial view in perspective of a modification to the preferred embodiment.

A modification to the embodiment shown in FIG. 4 can be found in FIG. 10, wherein similar parts are designated by similar numerals with the addition of the suffix b. To further enhance the petaling action of the walls 14b after the corners have been split, the walls 14b may be circumferentially relieved, as by groove 76, to provide a bend or hinge line disposed intermediate the axial extent of walls 14b.

At a previous stage in manufacturing, prior to the addition of the hardware, such as support 60, most manufacturers of refrigerators are today using a foamed-in-place insulating material. The present fastener may, if desired, and in those instances where extreme pressures are involved, include a resilient deformable sealing ring, not shown, within the cavity of the dished clamping surface 32 for additional sealing of the aperture 18. Generally, however, such additional sealing is not required. The application of foamed-in-place material to the back side of panel 20 results in an encasement of the wings 36 and the sealed body 34. When the foam rigidifies, in its chemical process, this encasement of the lateral wings 36 serves to assist the rigid element 16 as an antirotation preventing means during the driving of the screw 50 into the bore 40.

Figure 7:
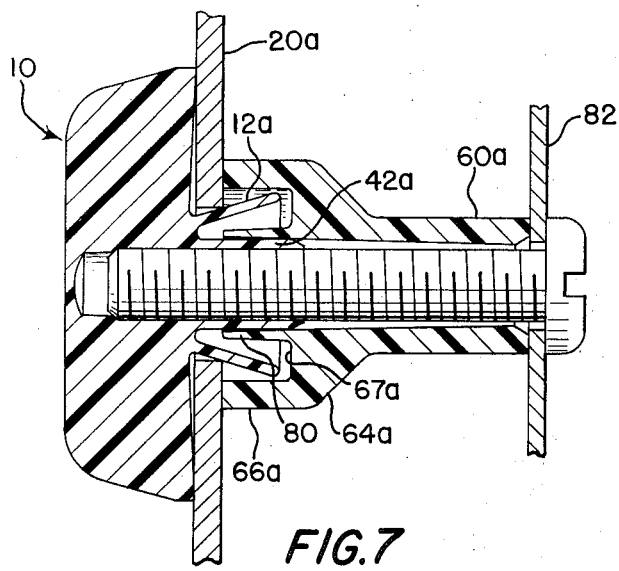
FIG. 7 is a side elevational view in section of a secondary embodiment of the invention shown in attached position with the secondary fastening means.
Figure 8:
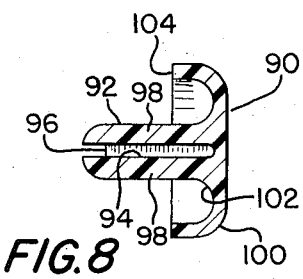
FIGS. 8 and 9 are a side elevational view in partial section and an end view of a hole plug which can be utilized with the present invention.
Figure 9:
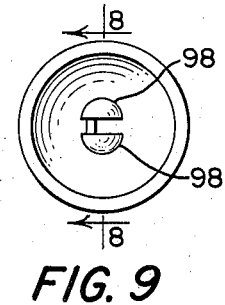

A modification of the present invention can be found in FIG. 7, wherein similar numerals are utilized to indicate similar parts with the addition of the suffix a. In this embodiment, the fastener 10a includes an increase in the axial length of the extension 42a whereby it axially extends a distance equal to or greater than the extent of head 12a. The support 60a includes a laterally extending flange 64a and a downwardly depending sealing element 66a for contacting the panel 20a. In this embodiment, sealing element 66a has a substantial axial extent with its free end spaced from the clamping wall 67a a distance in excess of the axial penetration of head 12a beyond the front side of panel 20a. Thus, head 12a is totally accepted within the cavity formed by sealing element 66a and clamping wall 67a without deformation, as opposed to the splitting, petaling deformed manner shown in the first embodiment. Additionally, support 60a is provided with a tubular extension 80 extending into the cavity and adapted to embrace in complimentary fashion the extension 42a. Thus, the wide distribution of load on the surfaces of panel 20a are further enhanced in shear by the combined functions of the inter-nesting extensions 42a and 80.

In this embodiment, the support 60a has been utilized as a spacer to mount a secondary member or panel 82, such as an evaporator pan or similar form, in spaced relation to the supporting panel 20a.

In many instances, as various models of appliances proceed down the assembly line, the less expensive models are not provided with certain features, even though the basic box liner is designed to accommodate all models and hence, fastening means such as the anchor fastener 10 have been installed in the liner. Where a certain piece of hardware is to be omitted, a suitable hole plug 90 can be provided. Such plugs 90 would include a shank 92 having a bifurcation or slot 94 and a connecting web 96 to provide a pair of lateral legs 98 movable toward one another in a resilient fashion to be acceptable within the bore 40. The head 100 is preferably recessed to provide a cavity 102 capable of accepting the cup-like head 12. When the shank 92 is telescoped within the bore 40, the leg portions 98 will spring toward one another against the inner surface of bore 40 until the sealing edge 104 of head 100 is brought into contact with the surface of panel 20. Thus, a smooth, decorative cover is provided for those anchors not used in a particular model.

It will be apparent to those skilled in the art that the secondary fastening means, although shown as a screw threaded element, may take many configurations. For example, the bore 40 could be provided with stepped shoulder means, not shown, which could cooperate with resilient friction or a ratchet-type engaging mechanism to insure retention of the secondary fastening means. Thus, the invention is not intended to be limited to screw threaded fasteners per se.

Figure 11:
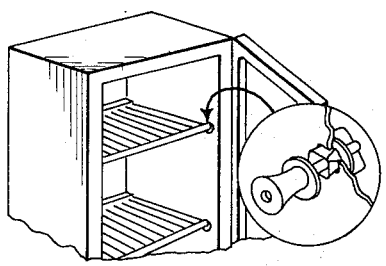
FIGS. 11 and 12 are illustrative examples of the present anchor utilized as a shelf support in a refrigerator and as a roller shelf support in a dishwasher.
Figure 12:
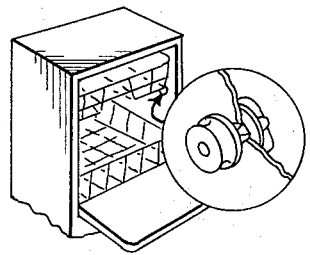

FIGS. 11 and 12 show typical applications of the anchor fastener 10 with FIG. 10 showing its use as a shelf support in a refrigerator or freezer unit while FIG. 11 shows the anchor fastener in association with a dishwasher shelf support roller.

Thus, the invention contemplates a simple, one-piece plastic device which is self-retaining and capable of accepting secondary fastening means from the opposite side of the panel. It can be injection molded in an economical die from suitable materials, such as nylon, which exhibit the necessary resilient qualities in thin sections while providing substantial rigidity in heavier cross sections.

I claim:

1. A one piece plastic anchor fastener for application to a generally square aperture and located on one side of a workpiece and secondary fastening means adapted to be associated with said fastener from the opposite side of said workpiece, said anchor including a head of square cross-section complimentary to said aperture, said head having a substantially square resilient relatively thin-wall cuplike configuration that tapers outwardly towards its free end to provide a cam-like outer clamping surface at each corner thereof, a relatively rigid element having at least portions thereof corresponding to and adapted to cooperate with said aperture in said panel, said element being positioned adjacent to and extending axially from the clamping surface of said head for receipt in said square aperture upon the passage of said head through said panel, thereby to traverse said panel and prevent further rotation of said fastener in said aperture, at least one of the portions of said rigid element being in a plane disposed at approximately 45° to a plane passing through one side of said head, a second head adjacent said rigid element and having a substantial work clamping surface axially spaced from the clamping surface of said first mentioned head sufficiently to resiliently grip said work panel therebetween, means projecting outwardly from said second head opposite to said work clamping surface including a bore closed at one end with the open end communicating with the interior of said cup-like configuration of said first mentioned head, and guide means surrounding the open end of said bore adapted to accept said secondary fastening means.

2. A fastener of the type claimed in claim 1 wherein said secondary fastening means is a screw.

3. A fastener of the type claimed in claim 1 wherein said secondary fastening means includes support means overlying said aperture on said opposite side of said panel and including means for supportive cooperation with said fastener.

4. A fastener of the type claimed in claim 1 wherein said rigid element includes at least two flat sides falling in planes which join at a sharp angle.

5. A fastener of the type claimed in claim 1 wherein said rigid element has four substantially flat sides, the walls of said first mentioned head being of substantially uniform thickness with the corners of said first mentioned head being truncated by surfaces which each fall in an angled plane that substantially includes the adjacent flat side of said rigid element and a point adjacent to the outer extremity of said corner to form a tapered cam surface for clamping cooperation with the apertured panel.

6. A fastener of the type claimed in claim 1 wherein said first mentioned head is relieved at its corners whereby axial pressure against the free extremity of said head causes said corners to separate to form petals which overlie said opposite side of said panel.

7. A fastener of the type claimed in claim 5 wherein said first mentioned head is further provided with a tapered groove at each truncated corner thereby thinning the corner wall thickness so that the application of an axial pressure on the free end of said head causes the corners of said cup-like configuration to split and further pressure causes the sides to petal into overlying relation to said opposite side.

8. A fastener of the type claimed in claim 1 wherein said secondary fastening means includes support means and a screw adapted to threadedly engage said bore, said support means having a base with an outer peripheral margin means adapted to engage said opposite side of said workpiece and an open ended central cavity defined by a wall facing said open end and said outer peripheral margin means defining the side wall of said cavity, said cavity adapted to accept said first mentioned head within its confines and a bore communicating with said cavity to accept said screw.

9. A fastener of the type claimed in claim 8 wherein said guide means includes an extension defining a continuation of said bore and projecting into said first mentioned head, means on said support means for cooperative engagement with said extension.

10. A fastener of the type claimed in claim 9 wherein said extension is a tubular-like member adapted to cooperate with a similar second member located within the cavity of said support member.

11. A fastener of the type claimed in claim 8 wherein said wall is spaced from a plane perpendicular to the axis of said secondary fastening means which passes through the outer extremity of said margin means a predetermined distance less than the distance that said first mentioned head projects through and beyond the opposite side of said panel whereby introduction of force by rotation of said screw causes said wall to forceably bear against the free end of said first mentioned head to thereby split the corners of said head and cause the sides to petal outwardly against the opposite side of said panel within the confines of said cavity.

12. A fastener of the type claimed in claim 1 wherein said means projecting outwardly from said second head includes a body portion for said bore and a non-circular means for gripping during rotatable insertion of said fastener in said panel.

13. A fastener of the type claimed in claim 12 wherein said body portion is a closed end tubular member and said gripping means is a wing element which extends substantially radially outwardly from said tubular member towards the margin of said second head and adapted to engage poured material located adjacent said panel and assist in preventing rotation of said fastener during driving of said secondary fastening means.

14. A fastener of the type claimed in claim 12 wherein said clamping surface of said second head is dished to provide sealing engagement with said panel.

15. A fastener of the type claimed in claim 14, wherein said second head is at least twice as great in diametral measurement as said first mentioned head to distribute the load factor against a fragile panel.

16. A fastener of the type claimed in claim 7 wherein the walls of said first-mentioned head are radially relieved along a substantial portion of a circumferential line disposed intermediate the axial extremities of said walls to thereby assist in petaling of said walls.

* * * * *